United States Patent
Johnson

(10) Patent No.: US 11,510,362 B2
(45) Date of Patent: Nov. 29, 2022

(54) CHANNEL KNIFEBACK

(71) Applicant: Keith A. Johnson, West Bend, WI (US)

(72) Inventor: Keith A. Johnson, West Bend, WI (US)

(73) Assignee: Kondex Corporation, Lomira, WI (US)

( * ) Notice: Subject to any disclaimer, the term of this patent is extended or adjusted under 35 U.S.C. 154(b) by 0 days.

(21) Appl. No.: 16/931,148

(22) Filed: Jul. 16, 2020

(65) Prior Publication Data

US 2021/0015033 A1 Jan. 21, 2021

Related U.S. Application Data

(60) Provisional application No. 62/875,693, filed on Jul. 18, 2019.

(51) Int. Cl.
*A01D 34/14* (2006.01)

(52) U.S. Cl.
CPC .................. *A01D 34/14* (2013.01)

(58) Field of Classification Search
CPC ....... A01D 34/14; A01D 34/145; A01D 34/17
See application file for complete search history.

(56) References Cited

U.S. PATENT DOCUMENTS

| | | | | |
|---|---|---|---|---|
| 453,705 A * | 6/1891 | Rieley | ..................... | A01D 34/14 56/302 |
| 628,873 A * | 7/1899 | Viskochil | ............... | A01D 34/14 56/302 |
| 4,198,803 A * | 4/1980 | Quick | ..................... | A01D 34/13 56/296 |
| 4,246,742 A * | 1/1981 | Clark | ................... | A01D 34/135 56/259 |
| 4,805,390 A | 2/1989 | Majkrzak | | |
| 4,854,114 A * | 8/1989 | Speck | ..................... | A01D 34/13 56/296 |
| 4,942,728 A | 7/1990 | Loring | | |
| 5,161,357 A | 11/1992 | Braunberger et al. | | |
| 5,979,152 A | 11/1999 | McCredie | | |
| 6,467,246 B1 | 10/2002 | McCredie | | |
| 6,708,476 B1 * | 3/2004 | Blakeslee | ............ | A01D 34/135 56/257 |
| 7,861,505 B1 * | 1/2011 | Figgins | .................. | A01D 34/14 56/296 |
| 8,151,547 B2 * | 4/2012 | Bich | ...................... | A01D 34/30 56/158 |
| 8,371,096 B2 * | 2/2013 | Johnson | ................ | A01D 34/14 56/298 |
| 9,538,703 B2 | 1/2017 | Cook et al. | | |
| 10,314,234 B2 * | 6/2019 | Schropp | ................ | A01D 61/02 |

(Continued)

FOREIGN PATENT DOCUMENTS

KR 10-2017-0120357 A 10/2017

*Primary Examiner* — Abigail A Risic
(74) *Attorney, Agent, or Firm* — Reinhart Boerner Van Deuren P.C.

(57) ABSTRACT

A knifeback for a sickle bar assembly that supports individual sickle sections is provided. The knifeback includes a bar having a channel formed longitudinally therein. Mounting holes extend through the bar and into the channel to facilitate mounting of sickle sections. The channel may provide strength and rigidity, provide structure for engaging sickle fastening bolts to prevent rotation thereof, and/or may be used to increase support and rigidity of a splicing member.

34 Claims, 7 Drawing Sheets

(56) References Cited

U.S. PATENT DOCUMENTS

| | | | | |
|---|---|---|---|---|
| 10,575,462 B2* | 3/2020 | Neely | A01D 34/283 |
| 2010/0050587 A1* | 3/2010 | Stoffel | A01D 34/14 |
| | | | 56/300 |
| 2011/0308224 A1* | 12/2011 | Buermann | A01D 34/14 |
| | | | 56/296 |
| 2012/0021663 A1 | 8/2012 | James | |
| 2012/0311988 A1* | 12/2012 | Johnson | A01D 34/14 |
| | | | 56/298 |
| 2015/0150190 A1* | 6/2015 | Klotzbach | A01D 34/14 |
| | | | 56/299 |
| 2018/0103580 A1* | 4/2018 | Neely | A01D 34/04 |
| 2021/0015033 A1* | 1/2021 | Johnson | A01D 34/14 |

* cited by examiner

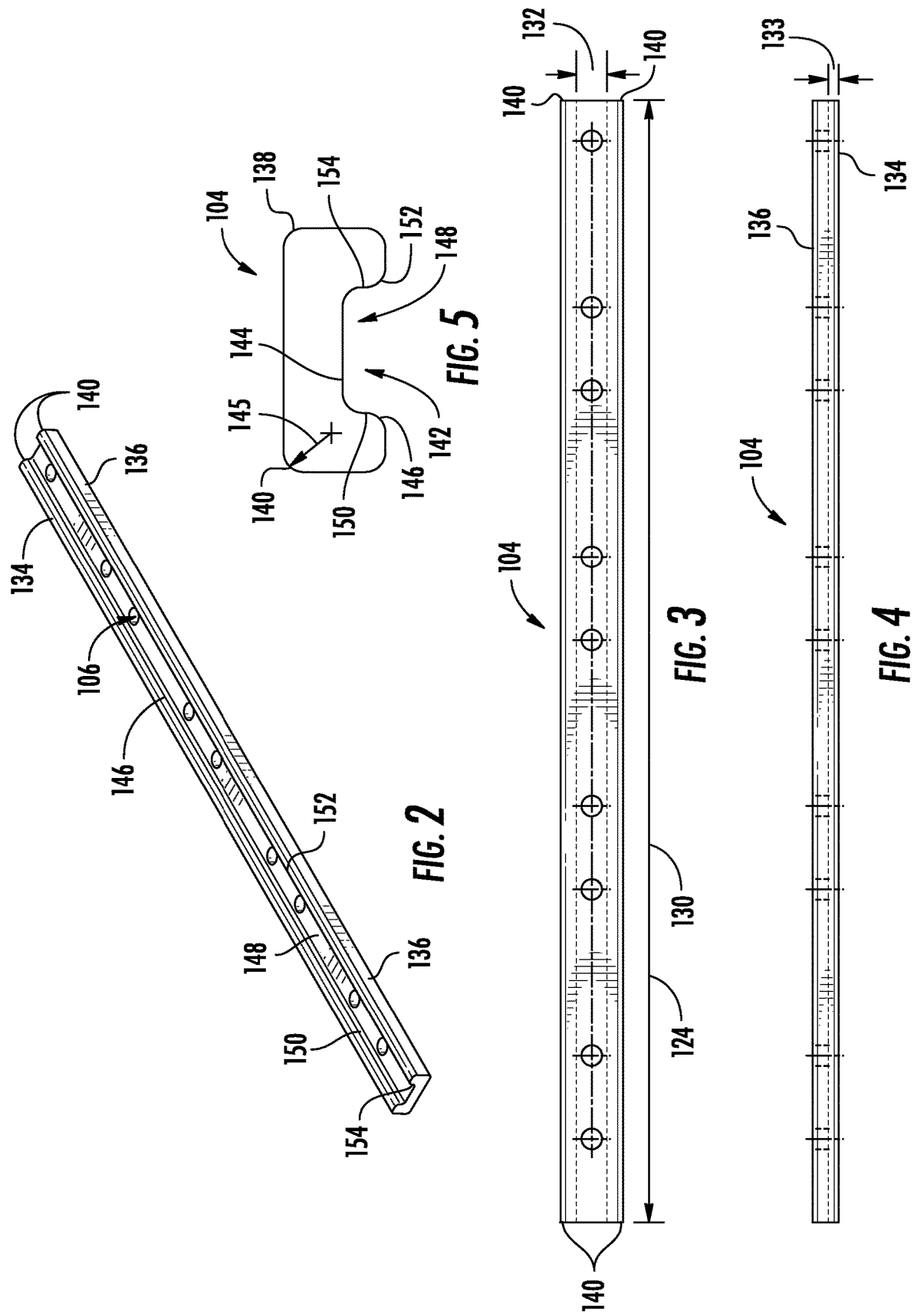

CHANNEL KNIFEBACK

CROSS-REFERENCE TO RELATED PATENT APPLICATIONS

This patent application claims the benefit of U.S. Provisional Patent Application No. 62/875,693, filed Jul. 18, 2019, the entire teachings and disclosure of which are incorporated herein by reference thereto.

FIELD OF THE INVENTION

This invention generally relates to knifebacks that are used in sickle bar assemblies, and more particularly to the structures formed into knifebacks for rigidity, strength, sickle mounting features and/or splicing.

BACKGROUND OF THE INVENTION

Knifeback material for sickle bar assemblies is currently only commercially available in a rectangular cross section, for example see U.S. Pat. No. 5,161,357 to Braunberger et al. (assigned to the present assignee Kondex) and U.S. Pat. No. 4,805,390 to Majkrzak (assigned to Crary). The material is usually a medium carbon steel manufactured in a cold rolling process. Cold rolling is preferred due to the work hardening aspects of the process. This process imparts a higher tensile strength in the material versus hot rolling which is better for high cycle fatigue. The thickness and width of knifeback varies to some degree by end user. The majority of knifeback produced today is ¼"×¾" or ¼"× 0.827" depending on the OEM design. Other sizes do exist in the market, but they are all a rectangular cross section.

The bolt type fasteners that exist in the market today fall into two categories, press-in and loose. The press-in type uses a knurled shank just under the head to press into the predrilled or punched round hole in the knifeback. The bolt is pressed into the knifeback during the assembly process. This locks the bolt in place to allow fastening the section to the knifeback without the use of a wrench on the bolt head. Changing these bolts in the field can be difficult if the knurl strips or the bolt is damaged. The old bolt must be removed with a hammer and punch and then the new bolt must be pressed back in. Often the end user uses the nut to pull the bolt back into the knifeback. This puts excessive loading on the bolt which can diminish the overall strength of the bolt and therefore the connection. This type of bolt is used by most major OEMs.

Loose fasteners do not press into the knifeback and are usually constrained from turning by some geometric feature of the bolt such as an oval. An example of this type of bolt and the corresponding oval hole in the knifeback can be seen in U.S. Pat. Nos. 6,467,246 and 5,979,152 to McCredie, both records being assigned to John Deere. The loose hardware allows the user to change the sickle sections easier by allowing the hardware to be removed and replaced without the use of a hammer and punch as described above. It also allows for easier removal of the knife section without removal of the knife guard or hold down in certain cases due to not having to lift the knife section over the bolts which are pressed into the knifeback.

Because the current state of the art requires a punched oval hole in the knifeback, the fatigue characteristics of the knifeback are compromised. Punched features result in a break and shear surface structure on the inside of the punched feature. Depending on the tooling set up, the shear portion may only be 20%-50% of the material thickness. The remaining break portion of the surface is material that is torn which contains a very rough surface. This rough surface acts as a crack initiation site for fatigue failures and results in lower fatigue characteristics compared to smooth surface holes.

As mentioned previously, most service sickles today are constructed in a segmented fashion to allow for easier shipment. Splice configurations include a typical butt type splice that uses a securing strap on the top and bottom along with longer bolts to splice the two sickle segments together or an overlap splice which is used by most OEMs today that too uses a top and bottom strap to create the splice along with the longer hardware. The overlap splice was previously covered by the aforementioned U.S. Pat. No. 4,805,390. Other splice arrangements and bar assemblies are shown in records to the current assignee include US Publication No. 2012/0311988 to Johnson; US 2010/0050587 to Stoffel; and U.S. Pat. No. 4,942,728 to Loring.

BRIEF SUMMARY OF THE INVENTION

Novel concepts presented herein and thus the resulting claim sets may pertain to one or more of the following.

A preferably "U" shaped channel knifeback used for securing sickle sections into a sickle knife assembly where the dimensions of the "U" shaped knifeback are such that they may minimize the weight of the assembly while increasing the rigidity of the structure.

The capturing of the head of the bolt within the knifeback material in a fashion that allows for the bolt to be freely inserted during assembly and freely removed during disassembly.

The use of a "T" shaped strap that facilitate a more structurally sound sickle knife splice for connecting two segments of sickle knife together.

A manufacturing process for sickle knifeback which utilizes the introduction of a slot, "V", or step into the knifeback to push the material wider to potentially improve upon the 3:1 limiting width to thickness ratio for higher hardness materials.

Proposed embodiments of the present invention relate to the principle component in sickle knife construction referred to as knifeback. Knifeback is the component in the assembly which all the other components connect to and can take the form of a bar as illustrated in the Figures. These components include sickle knife sections, knife heads, straps, overlaps, etc. Knifeback is usually made from steel with a rectangular cross section and an overall length equal to the length of the sickle knife. Proposed embodiments of the present invention utilize preferably a "U" shaped channel cross section to improve the fatigue properties of the knifeback when compared to the traditional knifeback of rectangular cross section where the weight per length of the channel knifeback may be equal to or less than that of the rectangular knifeback.

In addition to the fatigue life benefits of proposed embodiments, the channel in the bottom side of the knifeback allows for capturing the head of the hardware during the assembly process. This allows for easier removal of the sickle knife section when repairs are made in the field. Although loose hardware is not new to sickle knife construction, the benefit of the proposed design allows for the bolt holes to be drilled instead of punched which the current loose hardware designs require. Drilled holes have a smoother surface than a punched hole which reduces the crack initiation potential in high fatigue components such as knifeback.

Finally, the addition of the channel slot in the bottom of the knifeback allows for a more robust splice connection. Because sickle knives (a/k/a sickle bar assemblies) can be as much as forty feet in length, shipping replacement knives is problematic. The industry has therefore developed a concept of breaking long sickle knives into shorter segments to allow for shipping through common carriers such as UPS, FedEx, DHL, etc. Connecting these segments together in the field has traditionally used a strap kit which includes a top and bottom strap plus longer hardware to bolt the assemblies together. This design relies on the bolts to carry the load of the sickle knife in tension and torsion. The proposed design would use a "T" shaped bottom strap which would engage into the channel of the proposed knifeback design. This bottom strap would straddle the splice allowing for the bottom strap to resist the torsional forces placed on the joint thus making it stronger than current designs. The additional stiffness of the "T" shaped bottom strap would also allow for reducing the flexibility of the knife in the joint area.

An embodiment of the present utilizes a channel or "U" shaped cross section for the knifeback. This geometry allows for a more fatigue resistant component due to the cross-sectional shape when compared to standard rectangular geometry. Static and fatigue analysis shows this geometry to exhibit approximately 27% greater fatigue life in computer simulations.

In one aspect, a knifeback includes a bar. A channel is formed longitudinally into the bar. A plurality of mounting holes extend through the bar and into the channel. The mounting holes are in a longitudinally extending array and provide a plurality of sickle mounting locations in side by side relationship.

In another aspect, a knifeback includes a bar having a step formed longitudinally into the bar to provide a recess region. The recess region has a longitudinally extending shoulder and a plurality of mounting holes. The plurality of mounting holes extend through the bar in the recess region adjacent the step. The plurality of mounting holes are in a longitudinally extending array parallel to the longitudinally extending shoulder to provide a plurality of sickle mounting locations in side by side relationship.

In yet another aspect a sickle bar assembly is provided. The sickle bar assembly includes at least two knifebacks. Each knifeback includes a bar. A step is formed longitudinally into the bar to provide a recess region having a longitudinally extending shoulder. A plurality of mounting holes extend through the bar in the recess region adjacent the step. The mounting holes are in a longitudinally extending array parallel to the longitudinally extending shoulder and provide a plurality of sickle mounting locations in side by side relationship. Adjacent members of the at least two knifebacks are in end to end relation and joined by a splice member. The splice member includes a splice plate that is received into the channel and has a first surface engaging a sidewall of the step and a second surface engaging along at least one of the recess region and an outer bottom or top surface of the bar. The first surface is transverse to the second surface. The splice plate has splicing apertures aligning with selective members of the plurality of the mounting holes with fasteners securing the splice plate to adjacent members the at least two knifebacks.

Various features can be employed in any of the aspects or embodiments herein as follows.

The channel may be U-shaped.

The channel may be between front and back side surfaces of the bar and extends through opposite ends on opposite sides of the longitudinally extending array.

The channel may be a continuously shaped uninterrupted groove extending through opposite ends of the bar.

The bar can have a length dimension of between 1 meter and 20 meters and more preferably between 3 meters and 14 meters. The bar can have a height dimension of between 0.2 centimeters and 1.0 centimeters and more preferably between 0.5 centimeters and 0.7 centimeters. The bar has a width of between 1.5 centimeters and 3.0 centimeters and more preferably between 1.8 centimeters and 2.2 centimeters. The channel can have a length dimension matched to said length dimension of the bar and a width dimension of between 0.2 centimeters and 2.5 centimeters and more preferably between 0.8 centimeters and 1.5 centimeters. The channel can have a depth dimension of between 0.1 centimeters and 0.8 centimeters and more preferably between 0.2 centimeters and 0.5 centimeters.

The bar may be generally rectangular and defines rounded corners at the rectangular peripheral extents and at the channel entrance and at the channel bottom. The rounded corners have a radius of curvature between 0.1 mm and 6 mm and more preferably between 0.5 mm and 2 mm.

The bar can define a width to height ratio that is greater than 3:1.

The bar can define a width to height ratio of between 2:1 and 4:1.

The bar preferably is a cold roll formed steel member.

The knifeback may be part of a sickle bar assembly that includes the knifeback in combination with a plurality of sickle sections. The sickle sections are along at least one of a top side and bottom side of the sickle bar and at sickle mounting locations in side by side relationship. The sickle sections are secured to the bar by a plurality of fasteners.

The fasteners include a plurality of bolts and nuts. The bolts extend through the mounting holes. The bolts have a head engaging a channel sidewall to rotationally fix the bolts relative to the bar for fastening purposes.

Each bolt may include at least two flats engaging opposed sidewalls of the channel on opposite sides of the channel.

The fasteners can be loosely fitted in the mounting holes in a non-press fit manner.

The mounting holes may also be drilled holes.

The sickle bar assembly can include two knifeback members with a splice joint. Each knifeback member is in the form of said knifeback. The knifeback members are in end to end relation. A splice plate is received into the channel and has splice surfaces engaging opposite channel sidewalls of the channel to provide rigidity and load transfer therebetween. The splice plate has splicing apertures aligning with selective members of the mounting holes with fasteners that secure the splice plate to each of the two knifeback members.

The sickle bar assembly may include at least two splice joints for longer assemblies. Each splice joint uses the splice plate. Each splice joint uses a separate splice plate member.

The splice plate may be T-shaped and has first and second flanges that engage one of the top and bottom side of the sickle bar. A rail projection extends into the channel.

The rail projection may engage channel sidewalls and a channel bottom of the channel.

The channel sidewall may be tapered at an angle of between 0.5 degrees and 20 degrees from perpendicular as the channel sidewall extends from a top side or bottom side of the bar toward a channel bottom. The head of each bolt may be tapered to provide a tapered head.

The opposite sides of the tapered head may engage opposed channel sidewalls that converge toward one another from a top of the channel toward the channel bottom to form a tapered channel that is complimentary to the tapered head. The tapered head may be either conical or including opposed tapered flats. The tapered head of each bolt may be spaced from the channel bottom.

The two opposed flats of the tapered head may engage the opposed channel sidewalls on opposite sides of the channel to create a joint that interlocks the head and the bar secured by the plurality of fasteners.

The opposite channel sidewalls may converge toward one another from a top of the channel to a channel bottom to create a tapered channel. The splice surfaces may extend radially toward one another to form a tapered splice plate that is complimentary to the tapered channel. The splice surfaces may engage a respective one of the opposite channel sidewalls to create a joint that interlocks the splice plate and the bar that is secured by a plurality of fasteners.

In another aspect of the invention a method is provided. The method includes the steps of forming the knifeback by cold roll forming a steel blank into a rectangular shape and subsequently cold roll forming the channel therein to form the bar.

In an embodiment, the method includes the step of introducing a slot, V-shape, U-shape or other geometries forming a step formed into the knifeback, for example an L-shape.

Other inventive aspects and/or embodiments may be generally directed toward any of the subjects of the independent claims and/or dependent claims appended hereto either alone or in various combinations with other such claims.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is an isometric bottom view of the knifeback of FIG. 1;

FIG. 3 is a top view of FIG. 1;

FIG. 4 is a side view of FIG. 1;

FIG. 5 is an end view of FIG. 1;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there is illustrated in FIGS. 1-5 an exemplary embodiment of a knifeback 100 comprising a bar 104. Bar 104 maybe referred to as a "sickle bar" and "sickle bar assembly" herein is considered to be the knifeback in combination with at least sickle sections and fasteners. While such an exemplary environment will be utilized in describing various features and advantages of embodiments of the invention, such a description should be taken by way of example and not by limitation.

The knifeback 100 includes a channel 102. The knifeback 100 as illustrated may be a rolled product utilizing similar methods to other knifebacks. The channel 102 may be U-shaped. Fatigue analysis for an exemplary U-shaped channel geometry for the knifeback 100 with the channel 102 formed into the side bar 104. The channel 102 is U-shaped yielded a 27% improvement in fatigue life. The proposed concept should also be irrelevant of the material selected. Different material properties will certainly affect the overall fatigue life the part. However, the concept disclosed is strictly geometric and applies regardless of the material.

Figure 1:
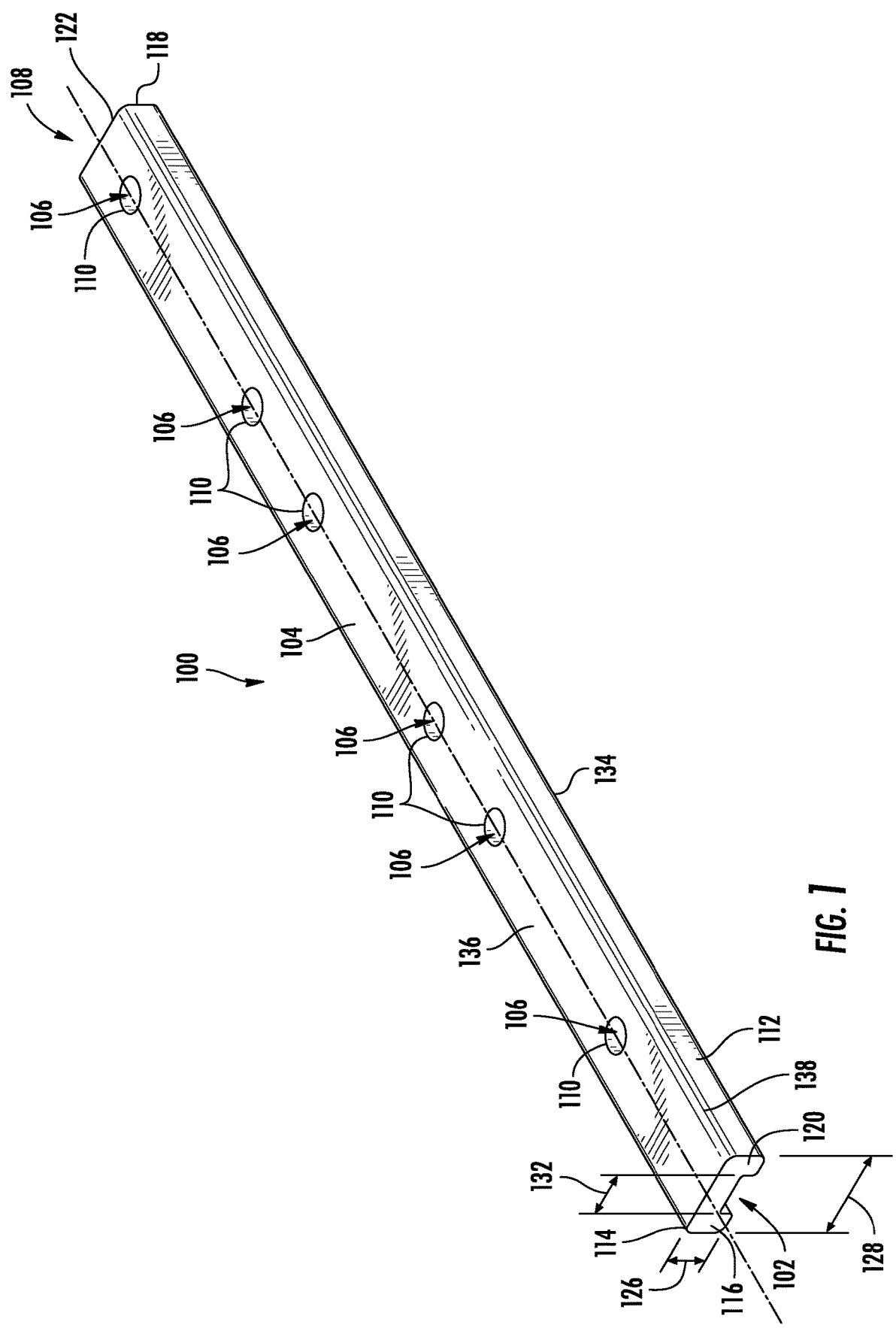
FIG. 1 is an isometric illustration of a knifeback in the form of a bar having a channel, in accordance with an embodiment of the present invention, additionally showing that the corners are rounded as a result of cold roll formation, with it being understood that the continuous length can be much longer in an embodiment (e.g. up to forty feet or more with additional holes and sickle mounting locations), but with a shorter embodiment illustrated for better detail.
Figure 6:
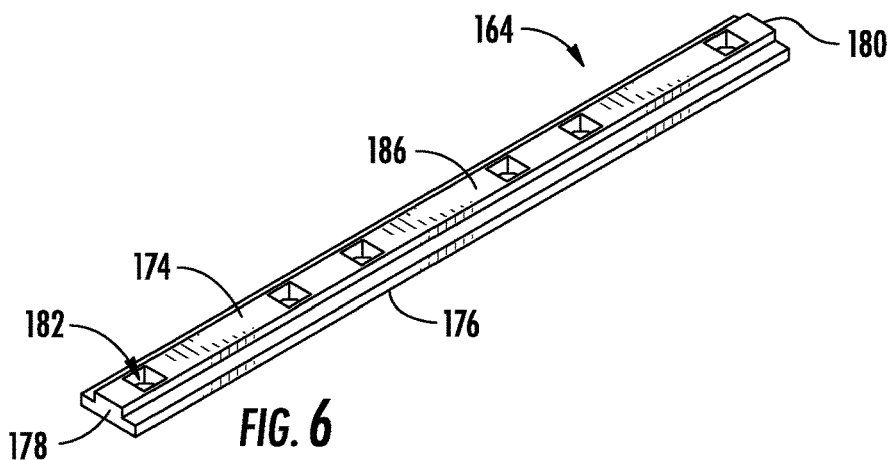
FIG. 6 is an isometric view from the top perspective of a splice plate useable with two or more of the knifebacks of FIG. 1.
Figure 7:
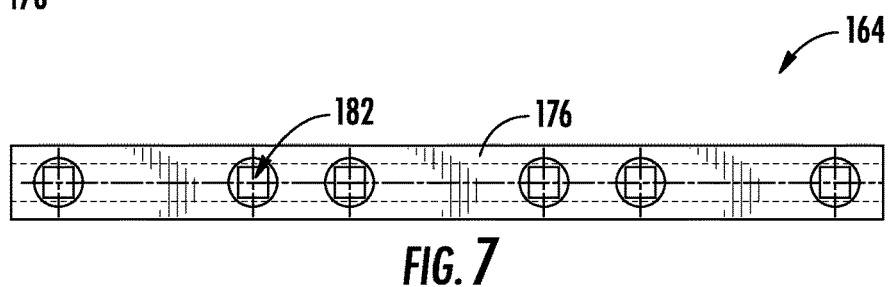
FIG. 7 is a bottom side view of the splice plate of FIG. 6.
Figure 8:
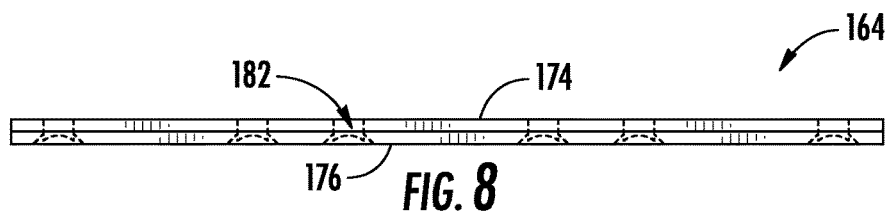
FIG. 8 is a front side view of the spice plate of FIG. 6.
Figure 9:
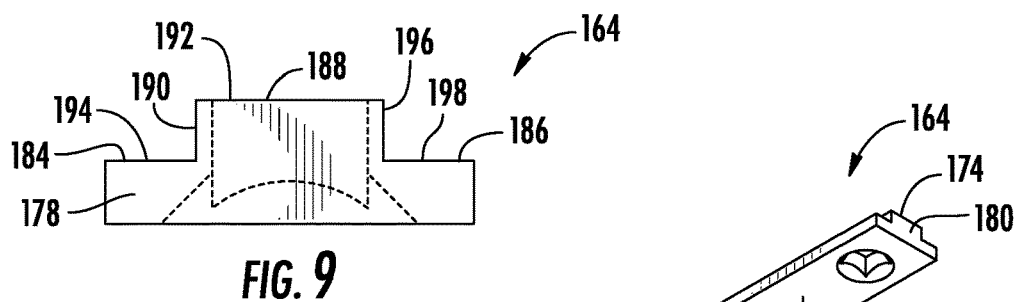
FIG. 9 is an end view of the splicing strap illustrated in FIG. 6.
Figure 10:
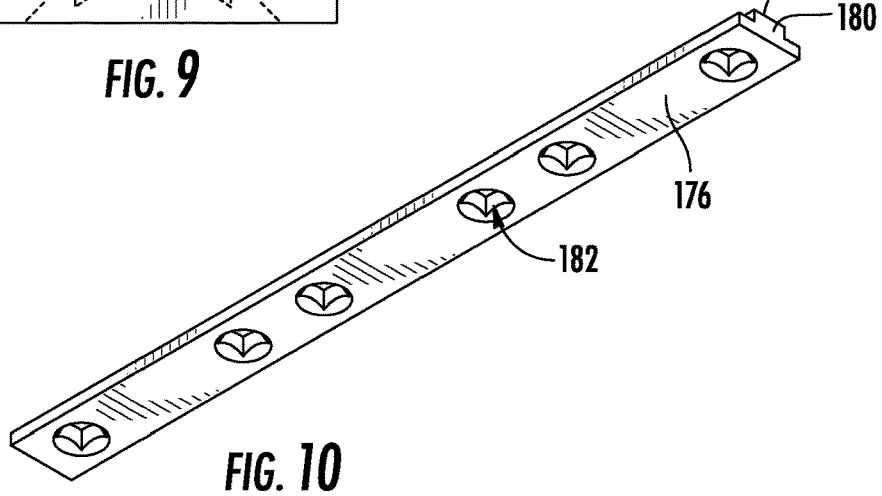
FIG. 10 is an isometric view from the bottom perspective of the splice plate of FIG. 6.
Figure 11:
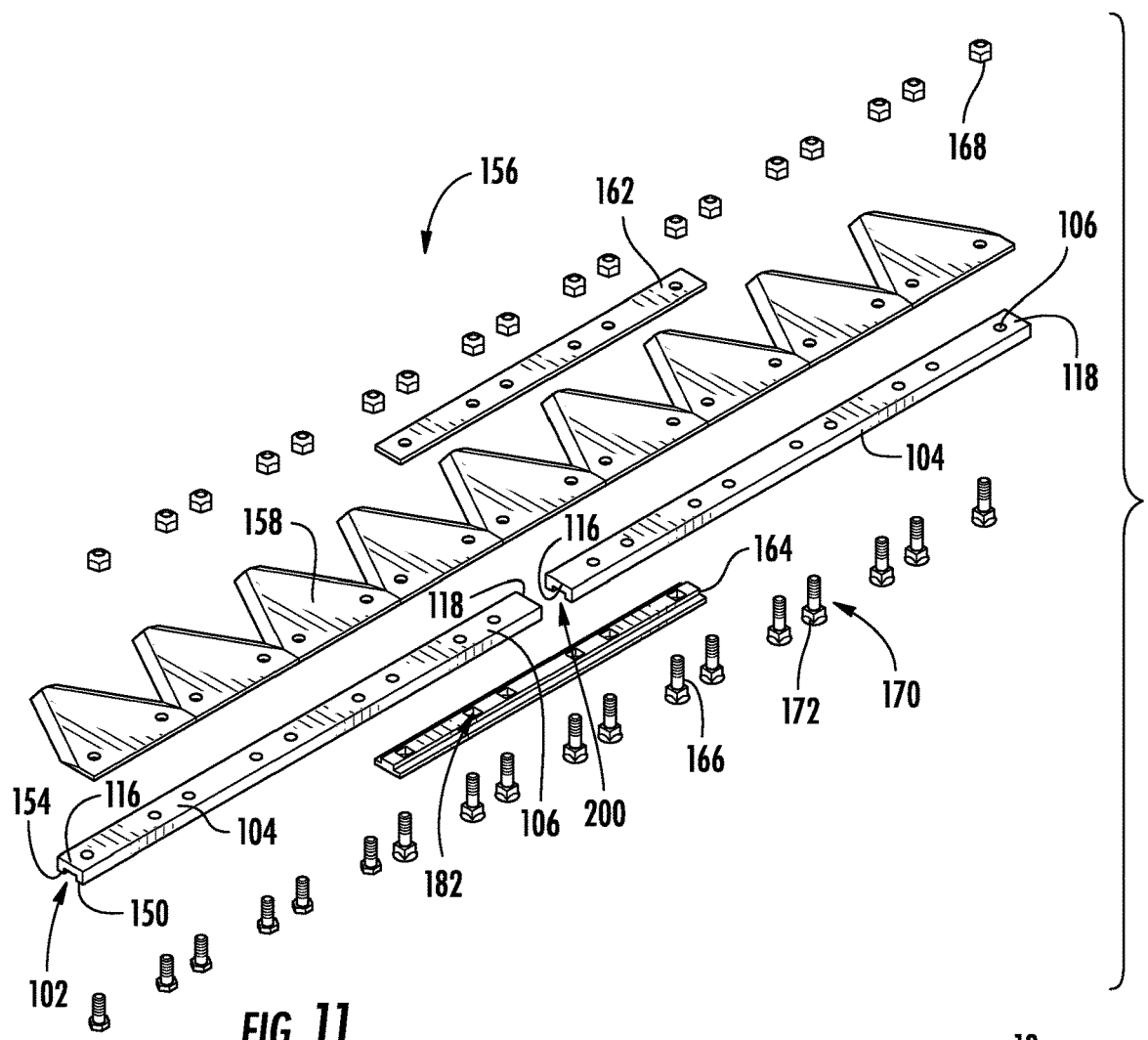
FIG. 11 is an exploded isometric assembly view of a sickle bar assembly with a splice joint according to an embodiment of the present invention using two knifebacks as shown in FIGS. 1-5, and a splice plate as shown in FIG. 6-10.
Figure 12:
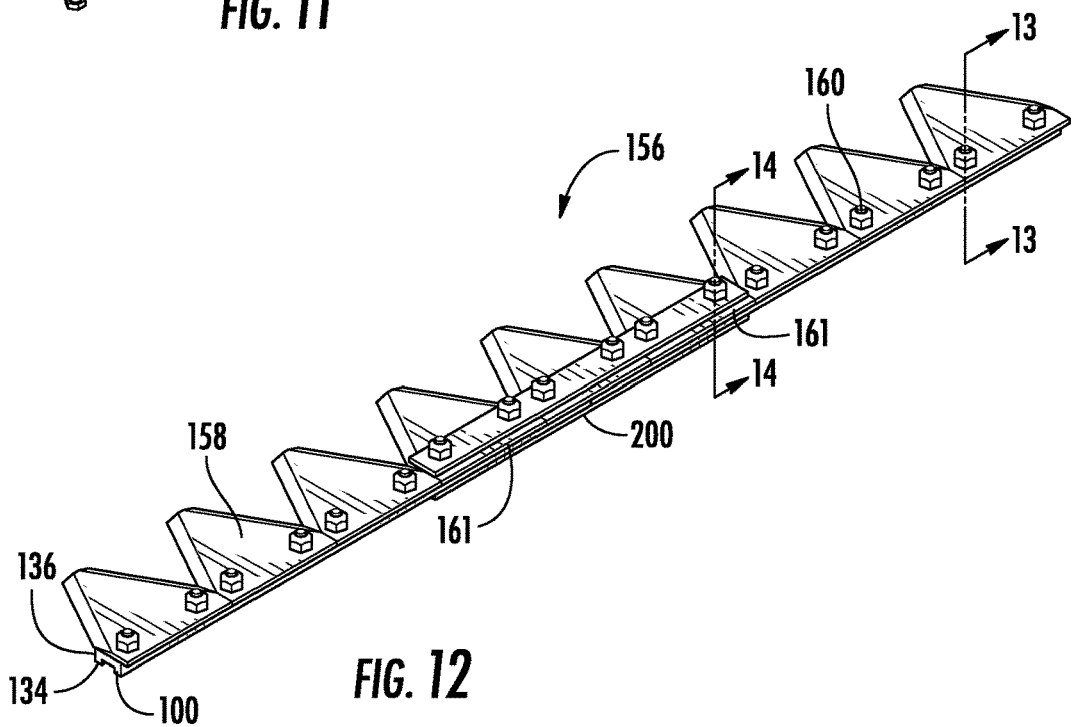
FIG. 12 is an assembled configuration and view of the sickle bar assembly that is assembled from the components of FIG. 11, with the sickle bar assembly being illustrated from the top side (alternatively but less preferably the sickle bar assembly may be used upside down and/or with the sickle bar flipped upside down).

The knifeback 100 includes a bar 104. The bar 104 may be a cold roll formed steel member. The knifeback 100 has the channel 102 formed longitudinally into the sickle bar 104, and a plurality of mounting holes 106 extending through the bar 104 and into the channel 102. The plurality of mounting holes 106 are in a longitudinally extending array 108 and provide a plurality of sickle mounting locations 110 in side by side relationship. The sickle mounting locations 110 are sized to receive individual ones of a plurality of sickle sections 158 in side by side relationship as can be seen in FIGS. 11 and 12.

The channel 102 is between a front side surface 112 and back side surface 114 of the bar 104 and extends through opposite ends 116, 118 on opposite sides 120, 122 of the longitudinally extending array 108. In a preferred embodiment the channel 102 may be centered between the front side surface 112 and the back side surface 114. The channel 102 is a continuously shaped uninterrupted groove extending through the opposite ends 116, 118 of the sickle bar 104.

For most applications, the bar 104 has a length dimension 124 of between 1 meter and 20 meters and in a preferred embodiment between 3 meters and 14 meters. The bar 104 has a height dimension 126, also referred as a thickness of between 0.2 centimeters and 1.0 centimeters and in a preferred embodiment between 0.5 centimeters and 0.7 centimeters. The bar 104 has a width 128 of between 1.5 centimeters and 3.0 centimeters and in a preferred embodiment between 1.8 centimeters and 2.2 centimeters.

For most applications, the channel 102 has a channel length dimension 130 matched to the length dimension 124 of the sickle bar 104. The channel 102 has a channel width dimension 132 of between 0.2 centimeters and 2.5 centimeters and in a preferred embodiment between 0.8 centimeters and 1.5 centimeters. The channel 102 has a channel depth dimension 133 of between 0.1 centimeters and 0.8 centimeters and more preferably between 0.2 centimeters and 0.5 centimeters. The channel depth dimension 133 is measured in a direction extending from the bottom side 134 of the bar 104 towards the top side 136 of the sickle bar 102.

The bar 104 is generally rectangular and defines rounded corners 138 at the rectangular peripheral extents 140 and at the channel entrance 142 and at the channel bottom 144. The rounded corners 138 have a radius of curvature 145 between 0.1 mm and 6 mm and in a preferred embodiment between 0.5 mm and 2 mm.

The bar 104 defines a width 128 to height 126 ratio. In an embodiment the width 128 to height 126 ratio is between 2:1 and 4:1 and in a preferred embodiment greater than 3:1.

The bar 104 includes a step 146 formed longitudinally into the bar 104 to provide a recess region 148. The step 146 includes a region of the bottom surface 134 of the bar 104 and a first channel side wall 150 also referred to as a shoulder and as a first shoulder. Thus, the recess region 148 has a first longitudinally extending shoulder 150. The plurality of mounting holes 106 extend through the bar 104 in the recess region 148 adjacent the step 146. The plurality of mounting holes 106 are in the longitudinally extending array 108 parallel to the longitudinally extending shoulder 150 to provide the plurality of sickle mounting locations 110 in side by side relationship.

Figure 15:
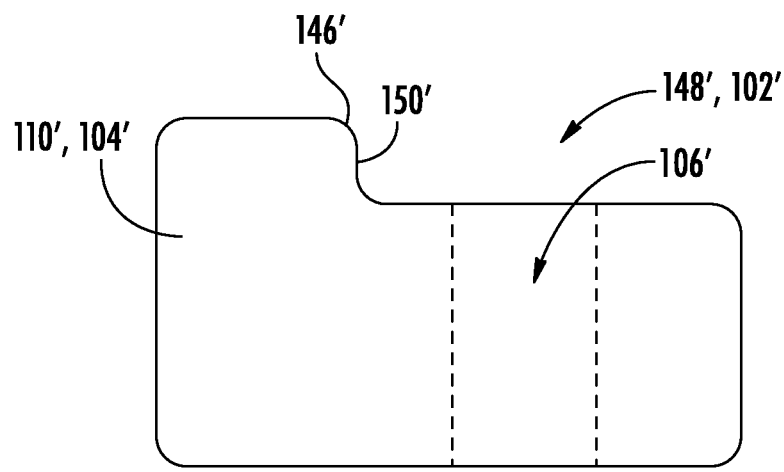
FIG. 15 is an end view of an L-shaped channel of another embodiment of a knife back.

With respect to the channel 102 that is U-shaped, a second step 152 is formed on the opposite side of step 146. However, embodiments may not need two steps 146, 152 as illustrated in FIG. 15. FIG. 15 illustrates a sickle bar 104' having a channel 102' that is L-shaped and has only a single step 146' providing a recess region 148,' a single longitudinally extending shoulder 150', and having a plurality of sickle mounting locations 110'.

However, where a second step 152 is provided, as in the U-shaped channel 102, the second step 152 is also formed longitudinally into the bar 104 to provide the recess region 148. The step 152 includes a region of the bottom surface of the sickle bar 134 and a second channel side wall 154 also referred to as a second shoulder. Thus, the recess region 148 also has a second longitudinally extending shoulder 154. The plurality of mounting holes 106 extend through the bar 104 in the recess region 148 adjacent the step 146 and adjacent the second step 152. The plurality of mounting holes 106 are in a longitudinally extending array parallel to the longitudinally extending shoulders 150, 154 to provide the plurality of sickle mounting locations 110 in side by side relationship.

Figure 16:
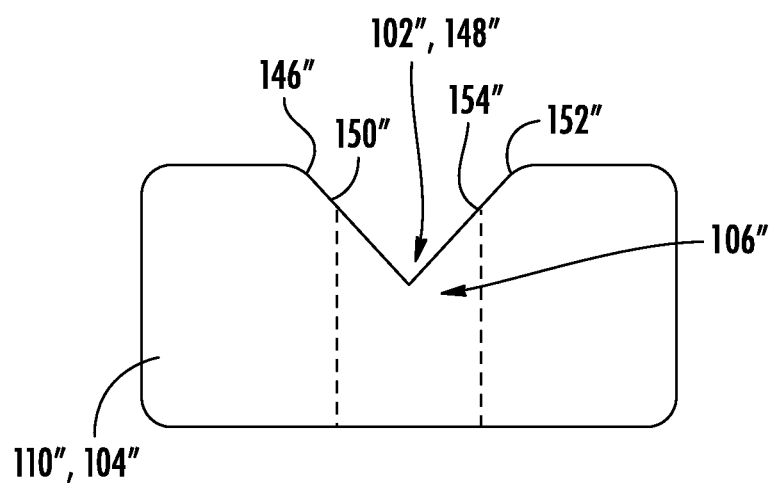
FIG. 16 is an end view of a V-shaped channel of another embodiment of a knifeback.

FIG. 16 illustrates a bar 104" having a V-shaped channel 102" with a first step 146" and a second step 152" providing recess regions 148" and having a plurality of sickle mounting locations 110".

Turning now to FIG. 12, a sickle bar assembly 156 that is spliced is illustrated. The sickle bar assembly 156 includes two of the knifebacks 100 comprising the bars 104 as discussed with respect to FIGS. 1-5. The sickle bar assembly 156 includes a plurality of sickle sections 158. The plurality of sickle sections 158 are mounted along the top sides 136 of the bars 104 and at the plurality of sickle mounting locations 110 in side by side relationship. The plurality of sickle section 158 are secured to the bars 104 by a plurality of fasteners 160. In an embodiment, the plurality of sickle sections 158 may be mounted to the bottom side 134 of sickle bar 104. Each bar 104 with sickle sections 158 mounted thereto may be considered a segment 161. Accordingly, FIG. 12 shows two segments 161 forming the sickle bar assembly 146. In the embodiment, the two segments 161 are spliced together to form the sickle bar assembly 156.

FIG. 11 illustrates an assembly view of the sickle bar assembly 156. The sickle bar assembly 156 includes an upper splice plate 162 mounted on some of the plurality sickle sections 158 which in turn are mounted on the sickle bars 104. The bars 104 receive in at least a portion of each of their channels 102 a splice plate 164 to provide the desired length of the sickle bar assembly 146. In other words, the sickle bar assembly 156 may include a single bar 104 without the splice plates 162,164, or as illustrated, may contain two bars 104 spliced together with 8 sickle sections 158. However, other embodiments may include more than two bars 104 until the desired length is reached as well as the desired number of sickle sections 158. The entire sickle bar assembly 156 is fastened together with the plurality of fasteners 160.

The plurality of fasteners 160 are a plurality of bolts 166 and nuts 168. The bolts 166 extend through the mounting holes 106 of the bar 104 and sickle sections 158. Each bolt 166 includes at least two flats 172 engaging opposed channel sidewalls 150, 154 on opposite sides of the channel 102. (FIG. 13) The mounting holes 106 may be drilled holes.

FIG. 11 also illustrates the bolts 164 to be a standard hex bolt. The concept presented does not require this. Other bolt head configurations such as a square head bolt are possible for use in this concept. A square head bolt may be preferable due to the greater amount of head engagement with the channel side walls 150, 154.

Figure 13:
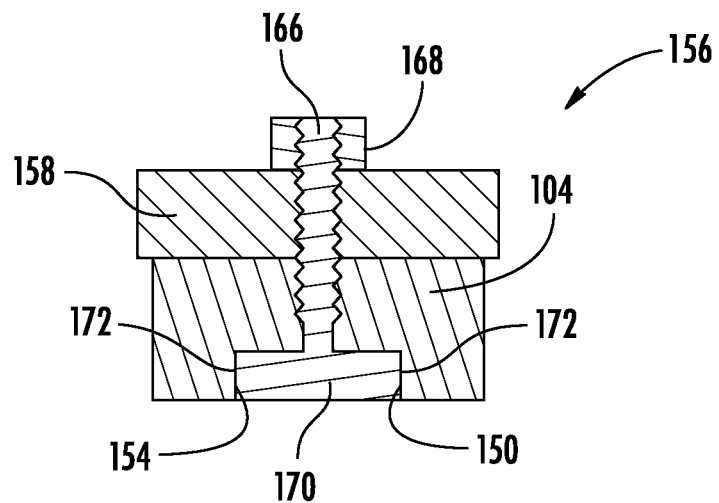
FIG. 13 is a cross section taken about a fastener of the sickle bar assembly of FIG. 12 where the splice plates are not present.

FIG. 13 illustrates a cross section of the sickle bar assembly 156 of FIG. 11 taken about one of the fasteners 160 that secure the sickle section 158 to the bar 104 utilizing the channel 102 that is U-shaped and at a section of the sickle bar assembly 156 without the upper splice plate 162 and without the splice plate 164. The bolts 166 have a head 170 that engages the channel sidewall 150 to rotationally fix the bolts 164 relative to the bar 104 for fastening purposes. The two flats 172 of each bolt 166 engage opposed channel sidewalls 150, 154 on opposite sides of the channel 102. (FIG. 13) The fasteners 160 are loosely fitted in the mounting holes 106 in a non-press fit manner. In this embodiment the head 170 engages the channel bottom 144 to provide axial clamping force. However, as will be discussed in other embodiments (e.g. FIGS. 17 and 18), the head 170 may be tapered and need not engage the channel bottom 144 to achieve the desired joint strength and mechanical interlock between the head 170 and the bar 104.

The unique characteristics of the knifeback 100 with its channel 102 concept allow the head 170 of the bolt 166 to be restrained from turning when inserted into the channel 102. This allows the bolt 166 to be freely inserted and removed from the sickle bar assembly 156 while still maintaining the industry requirement for securing the bolt 166 from turning while assembling the nut 168 onto the bolt 166. In present "loose" assembly, the punching process to create oval holes as the mounting holes 106 creates an undesirable condition in the break portion of the mounting hole 106. Other providers of sickle knives use loose hardware however these require the use of a wrench on the bottom side of the assembly to secure the head of the bolt during assembly of the nut. Accordingly, preferably the sickle section mounting holes 106 drilled rather than being punched, and the one or two shoulder(s) 150, 152 created by the U-shaped channel 102 can engage the heads 170 of the bolts 166.

Figure 14:
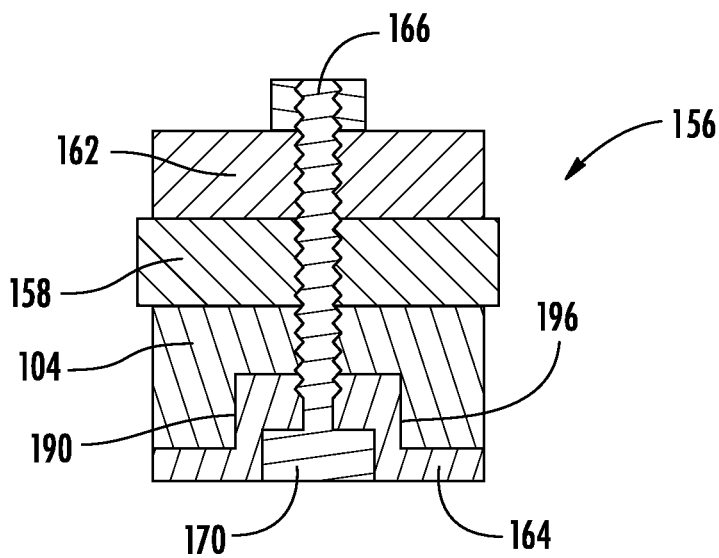
FIG. 14 is a cross section take about a fastener of the sickle bar assembly of FIG. 12 where the splice plates are present.
Figure 17:
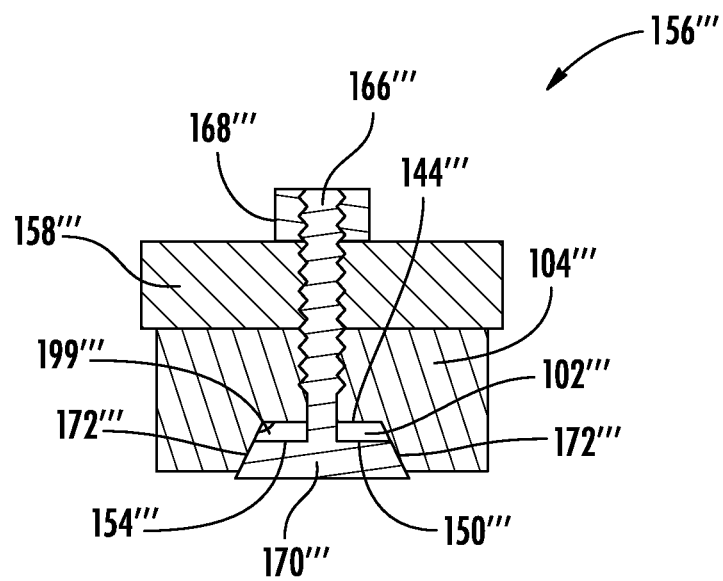
FIG. 17 is cross section taken as in FIG. 13, but of an embodiment of a sickle bar assembly having a tapered channel.

While shoulders 150, 154 of the channel 102 may extend perpendicularly away from the channel bottom 144 as seen for example in FIGS. 13 and 14, it is not the intent to limit the disclosure to only such embodiments. FIG. 17 illustrates an embodiment of a sickle bar assembly 156''' wherein during the cold rolling process to form the channel 102''', a draft angle 199''' may be imposed on the inside of the channel 102''' such that the shoulders 150''', 154''' (which create steps as the embodiments previously discussed) extend radially away from one another in a direction extending from the channel bottom 144''' toward a top of the channel 102''' to form a tapered channel 102'''. The draft angle 199''' created between the shoulders 150''', 154''' and the channel bottom 144''' may be between 0.5 and 20 degrees of perpendicular. As shown, the tapered channel 102''' may be considered to be V-shaped for a high draft angle 199''' e.g. greater than 10 degrees or U-shaped (e.g. if the daft angle is 10 degrees or less.)

The faces 172''' of the bolt 166''' extend radially towards one another in a direction from a top of the head 170''' of the bolt 166''' to a bottom of the head 170''' of the bolt 166''' (e.g. toward the bolt's 166''' threaded shaft) to create a tapered head. The tapered faces 172''' match, that is, are complimentary to the taper of the channel 102''' such that when bolt 166''' is inserted into the channel 102''' there may be sufficient interlock created to provide the advantage of creating a wedging effect between the faces 172''' of the bolt 166''' and the shoulders 150''', 154''' of the channel 102'''. This wedging may strengthen the joint even though it may preclude the bolt 166''' from "bottoming out" in the channel 144'''. In an example, the bolt head 170''' may also be conical in shape with a matching conical channel 102''' for receiving the bolt head.

While the "U" shaped concept appears to provide considerable fatigue improvement, it should be noted that the overall concept is not limited to the "U" shape. Theoretically, geometries where one leg is shorter than the other leading to even a "L" shaped material could be possible while still maintaining the key characteristics of the concept. The L-shaped concept could also have a draft angle similar to draft angle 199''' of the FIGS. 17-18 embodiment on the one shoulder and step of between 0.5 and 20 degrees of the prior embodiments for example.

As previously discussed, the "L" shaped channel 102' has a single step 146' and a single longitudinally extending shoulder 150' to prevent a bolt head 170 from turning. However, preferably, there are shoulders 150, 150', 154, 154' on both sides of the channel 102, 102" as in FIG. 1 and FIG. 16. These contemplated embodiments are covered under this application. For example, all of these knifeback 100 concepts mentioned herein (e.g. U-channel, or V-channel or L-channel, or tapered channel) include, as discussed with respect to FIGS. 1-5, a step 146, formed longitudinally into the bar 104 to provide a recess region 148 having a longitudinally extending shoulder 150, and a plurality of mounting holes 106 extending through the bar 104 in the recess region 148 adjacent the step 146. The mounting holes 106 are in a longitudinally extending array parallel to the longitudinally extending shoulder 150 to provide a plurality of sickle mounting locations 110 in side by side relationship.

Turning now to FIGS. 6-10, the splice plate 164 is illustrated. The splice plate 164 has a top side 174 and a bottom side 176 each extending between a first end 178 and a second end 180. A plurality of splicing apertures 182 extend in a longitudinally extending array between the first end 178 and the second end 180 and are spaced to match the spacing the plurality of mounting holes 106 of the bar 104 (FIG. 12). Each splicing aperture 182 has a geometry shaped to receive therein the head 170 of the bolt 160 so as to prevent rotational movement of the bolt 160 relative to the splice plate 164.

The splice plate 164 may be T-shaped having a first flange 184 and a second flange 186 that engage the top side 174 (understanding that top side may be relative and thus could be discussed as a bottom side) of the bar 104 when mounted to the bar 104 (FIGS. 12, 13). A rail projection 188 extends into the channel 102 when mounted to the bar 104 (FIGS. 12,13). The rail projection 188 includes a first splice surface 190 that extends between a first top surface 192 of the rail projection 188 and the planar first top surface 194 of the first flange 184 and forms a first rail side. The rail projection includes a second splice surface 196 that extends between a first top surface 192 of the rail projection 188 and the planar second top surface 198 of the second flange 186 and forms a second rail side.

The first and second splice surfaces 190, 196, may be flat, that is planar as may the top surface 192 of the rail projection 188 but it is not the intent to limit the teachings of this disclosure to such flat/planar surfaces as the splice surfaces 190, 196 and top surface 192 need not be flat but may have any geometry/contoured surface that may be complimentary for mechanical interlock with the respective channel sidewalls/shoulders 150, 154 and or the channel bottom 144 in embodiments where engagement with the channel bottom 144 is desired, other embodiments need not have engagement with the channel bottom 144 to achieve the desired joint strength and/or mechanical interlock.

The novel splice plate concept is only possible because of the knifeback 100 with the channel 102 design. Because the splice strap (also referred to as a plate) 164 is in the cross-sectional shape preferably of a "T" geometry it is sized such that it fits securely inside the "U" shaped geometry of the channel 102 knifeback 100. This interlocking of the two members creates a more structurally sound joint between the segments 161. (FIG. 12)

At this point in this disclosure, it can be appreciated that geometries other than the "T" geometry are covered by this disclosure. For example, the splice plate 164 may be "L" shaped so as to be accepted into the "L" shaped channel 102' of FIG. 15. In yet other examples, the splice plate may, instead of having a rail projection have a geometrical projection that is complimentary to the channel of the sickle bar so as to be received therein to create the interlock discussed above. For example, instead of the rail projection 188, there may be an inverted "V" projection to be received in the "V" shaped channel 102" as seen in FIG. 16. The rail projection may additionally be tapered as illustrated in FIG. 18.

Figure 18:
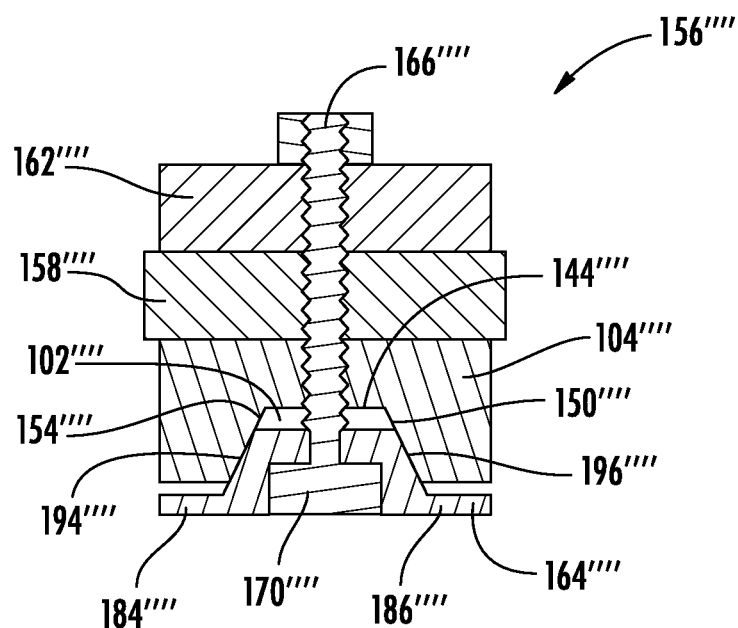
FIG. 18 is a cross section taken as in FIG. 14, but of an embodiment of a sickle bar assembly having a tapered channel and a tapered splice plate.

In the embodiment illustrated in FIG. 18 of the sickle bar assembly 156"", the channel 102"" is formed in a cold rolling process and a draft angle is imposed on the inside of the channel 102"" such that the shoulders 150"", 154"" are tapered towards the channel bottom 144"". Thus the draft angle created between the shoulders 150"", 154"" and the channel bottom may be between 0.5 and 20 degrees of perpendicular. In a preferred embodiment the draft angle may be between 2 and 7 degrees of perpendicular and this would be considered U-shaped. To create an interlock between the bar 104"" and the splice plate 164"" flat splice plate surfaces 190"", 196"" of the splice plate 164"" are also tapered to match the taper of the shoulders 150"", 154"" so that when the splice plate 164"" is inserted into the channel 102 it may have the advantage of creating a wedging effect between the first and second flat splice plate surfaces 190"", 196"" and the shoulders 150"", 154"" of the channel 102"". This wedging may strengthen the joint even though it may preclude the splice plate 164"" from "bottoming out" in the channel 102"" and may prevent the first and second flanges 184"", 186"" from engaging the bar 104"".

As shown with respect to the bar 104 in FIG. 2, in an embodiment, the splice plate 164 and the upper splice plate 162 (FIG. 11) may have rounded corners and edges as a result of the cold rolling/forming process to improve fatigue strength as it does in the sickle bar 104.

Turning again to FIGS. 11, 12, and 14, in the embodiment illustrated, the sickle bar assembly 156 includes two of the knifebacks 100. It can now be readily understood in light of the splicing discussion, that the sickle bar assembly 156 could include two or more knifebacks 100 until the desired length is reached. Each knifeback 100 is in the form of the knifeback 100 that has heretofore been described. The knifeback 100 members are in end 116, 118 to end 116, 118 relation. The splice plate 164 is received into the channels 102 of each knifeback 100 to form the joint 200 present at the ends 116,118 of each knifeback 100. The splicing apertures 182 align with selective members of the mounting holes 106 with the fasteners 160 to secure the splice plate 164 to each of the two knifeback members 100. While the embodiment illustrated has a single joint 200, it can be readily appreciated that more knifebacks 100 may be joined in end to end relation to form another joint 200. Accordingly, in such embodiments each joint would be formed from another/different splice plate 164 such that each joint 200 would have its own splice plate 164.

With reference to FIGS. 11 and 12 and as seen in the cross section of FIG. 14 (see also FIG. 18), when the splice plate 164 is received into the channel 102, the splice plate 164 has its first splice surface 190 and its second splice surface 196 engaging opposite channel sidewalls 150, 154 of the knifebacks 100 as well as the channel bottom 144 to provide rigidity and load transfer therebetween. It may not be necessary for the channel bottom 144 to be engaged to achieve the desired mechanical interlock. The first and second splice surfaces 190, 196 are transverse to the first top surface 192 of the rail projection 188.

In a preferred embodiment the top surface 192 may be planar but its surface shape may be of a geometry, for example rounded or "v" shaped to compliment the channel bottom 144 surface as would be the case for the knifeback embodiment of FIG. 16.

The splice plate 164 has its splicing apertures 182 aligned with selective members of the plurality of the mounting holes 106 with fasteners 160 to secure the splice plate 164 to adjacent members the at least two knifebacks 100.

Finally, a problem for which a solution was being sought that resulted in this concept was the geometric constraints of rolling high hardness material for the knifeback 100. There appears to be a cold rolling limitation of knifebacks of a 3:1 ratio for width 128 to thickness 126 in order to prevent cracking of the corners 138 when dealing with harder materials. This ratio was is not preferable, but as there is no choice it has been accepted. The concept of a channel shape was derived from a concept of possibly rolling an initial shape in the 3:1 ratio as required but in the final few rolling stands introduce forming rolls in introduce the channel slot which would push the material wider as the center material was displaced (e.g. beyond 3:1). Typically cold rolling involves starting with round blank stock and then progressively deforming into the desired shape through a plurality of progressive set of rolls/dies.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A knifeback, comprising: a bar, a channel formed longitudinally into the bar, and a plurality of mounting holes extending through the bar and into the channel, the mounting holes being in an longitudinally extending array providing a plurality of sickle mounting locations in side by side relationship.

2. The knifeback of claim 1, wherein the channel is U-shaped.

3. The knifeback of claim 1, wherein the channel is between front and back side surfaces of the bar and extends through opposite ends on opposite sides of the longitudinally extending array.

4. The knifeback of claim 1, wherein the channel is a continuously shaped uninterrupted groove extending through opposite ends of the bar.

5. The knifeback of claim 1, wherein the bar comprises:
  (a) a length dimension of between 1 meter and 20 meters (more preferably between 3 meters and 14 meters);
  (b) a height dimension of between 0.2 centimeters and 1.0 centimeters;
  (c) a width of between 1.5 centimeters and 3.0 centimeters; and
  wherein the channel comprises a length dimension matched to said length dimension of the sickle bar and
  a width dimension of between 0.2 centimeters and 2.5 centimeters; and
  a depth dimension of between 0.1 centimeters and 0.8 centimeters.

6. The knifeback of claim 1, wherein the bar is generally rectangular and defines rounded corners: at the rectangular peripheral extents, and at the channel entrance; at the channel bottom; the rounded corners having a radius of curvature between 0.1 mm and 6 mm.

7. The knifeback of claim 1, wherein the bar defines width to height ratio is greater than 3:1.

8. The knifeback of claim 1, wherein the bar defines a width to height ratio of between 2:1 and 4:1.

9. The knifeback of claim 1, wherein the bar is a cold roll formed steel member.

10. A sickle bar assembly comprising the knifeback of claim 1 in combination with a plurality of sickle sections, the plurality sickle sections being along a top side or bottom side of the bar and at sickle mounting locations in side by side relationship secured to the bar by a plurality of fasteners.

11. A sickle bar assembly comprising a knife back comprising a bar, a channel formed longitudinally into the bar, and a plurality of mounting holes extending through the bar and into the channel, the mounting holes being in an longitudinally extending array providing a plurality of sickle mounting locations in side by side relationship, the knifeback in combination with a plurality of sickle sections, the plurality sickle sections being along a top side or bottom side of the bar and at sickle mounting locations in side by side relationship secured to the bar by a plurality of fasteners;
  wherein the plurality of fasteners comprise a plurality of bolts and nuts, the plurality of bolts extending through the plurality of mounting holes, each one of the plurality of bolts having a head engaging a channel sidewall to rotationally fix the bolt relative to the sickle bar for fastening purposes.

12. The sickle bar assembly of claim 11, wherein each one of the plurality of bolts include at least two flats engaging opposed channel sidewalls on opposite sides of the channel.

13. The sickle bar assembly of claim 11, wherein the plurality of fasteners are loosely fitted in the plurality of mounting holes in a non-press fit manner, the plurality of mounting holes being drilled holes.

14. The sickle bar assembly of claim 10, comprising two knifeback members, each knifeback member being in the form of said knifeback, the knifeback members in end to end relation, and further comprising a splice plate received into the channel and having splice surfaces engaging opposite channel sidewalls to provide rigidity and load transfer therebetween, the splice plate having splicing apertures aligning with selective members of the mounting holes with fasteners securing the splice plate to each of the two knifeback members.

15. The sickle bar assembly of claim 14, further comprising at least two splice joints each splice joint using a separate splice plate member.

16. The sickle bar assembly of claim 14, wherein the splice plate is T-shaped having first and second flanges engaging one of the top and bottom side of the sickle bar, and a rail projection extending into the channel.

17. The sickle bar assembly of claim 16, wherein the rail projection engages channel sidewalls and a channel bottom of the channel.

18. A method of forming the knifeback of claim 1, comprising: cold roll forming a steel blank into a rectangular shape and subsequently cold roll forming the channel therein to form the bar.

19. The method of claim 18, wherein the method further comprises introduction of a slot, or V-shape, or U-shape or step into the bar of the knifeback.

20. A knifeback, comprising: a sickle bar, a step formed longitudinally into the bar to provide a recess region having a longitudinally extending shoulder, and plurality of mounting holes extending through the sickle bar in the recess region adjacent the step, the plurality of mounting holes being in an longitudinally extending array parallel to the longitudinally extending shoulder to providing a plurality of sickle mounting locations in side by side relationship.

21. The knifeback of claim 20, wherein the bar is a cold roll formed steel member.

22. The knifeback of claim 21, wherein the bar comprises: (a) a length dimension of between 1 meter and 20 meters; (b) a height dimension of between 0.2 centimeters and 1.0 centimeters; (c) a width of between 1.5 centimeters and 3.0 centimeters; and wherein the step comprises: a width dimension of between 0.2 centimeters and 2.5 centimeters and a depth dimension of between 0.1 centimeters and 0.8 centimeters.

23. A sickle bar assembly comprising the knifeback of claim 20 in combination with a plurality of sickle sections, the sickle sections being along a top side or bottom side of the sickle bar and at sickle mounting locations in side by side relationship secured to the bar by a plurality of fasteners.

24. The sickle bar assembly of claim 23, wherein the plurality of fasteners comprise a plurality of bolts and nuts, the bolts extending through the plurality of mounting holes, the bolts having a head engaging a sidewall of the step to rotationally fix the bolts relative to the bar for fastening purposes.

25. The sickle bar assembly of claim 24, wherein the plurality fasteners are loosely fitted in the holes in a non-press fit manner.

26. A sickle bar assembly, comprising at least two knifebacks, each knifeback, comprising: a sickle bar, a step formed longitudinally into the bar to provide a recess region having a longitudinally extending shoulder, and a plurality of mounting holes extending through the sickle bar in the recess region adjacent the step, the mounting holes being in an longitudinally extending array parallel to the longitudinally extending shoulder and providing a plurality of sickle mounting locations in side by side relationship; wherein adjacent members of the at least two knifebacks are in end to end relation and joined by a splice member, the splice member comprising a splice plate received into the channel and having a first surface engaging a sidewall of the step and a second surface engaging along either or both of: (a) the recess region or (b) an outer bottom or top surface of the bar, the first surface being transverse to the second surface, the splice plate having splicing apertures aligning with selective members of the plurality of the mounting holes with fasteners securing the splice plate to adjacent members the at least two knifebacks.

27. The sickle bar assembly of claim 26, further comprising at least two splice joints each splice joint using the splice plate and with each splice joint using a separate splice plate member.

28. The sickle bar assembly of claim 26, wherein the splice plate is T-shaped having first and second flanges engaging the top side or bottom side of the sickle bar, and a rail projection extending into a channel that provides the step.

29. A sickle bar assembly, comprising at least two knifebacks, each knifeback, comprising: a sickle bar, a step formed longitudinally into the bar to provide a recess region having a longitudinally extending shoulder, and a plurality of mounting holes extending through the sickle bar in the recess region adjacent the step, the mounting holes being in an longitudinally extending array parallel to the longitudinally extending shoulder and providing a plurality of sickle mounting locations in side by side relationship; wherein adjacent members of the at least two knifebacks are in end to end relation and joined by a splice member, the splice member comprising a splice plate received into the channel and having a first surface engaging a sidewall of the step and a second surface engaging along either or both of: (a) the recess region or (b) an outer bottom or top surface of the bar, the first surface being transverse to the second surface, the splice plate having splicing apertures aligning with selective members of the plurality of the mounting holes with fasteners securing the splice plate to adjacent members the at least two knifebacks;
  wherein the splice plate is T-shaped having first and second flanges engaging the top side or bottom side of the sickle bar, and a rail projection extending into a channel that provides the step;
  wherein the rail projection engages channel sidewalls.

30. The sickle bar assembly of claim 11, wherein the channel sidewall is tapered at an angle of between 0.5 degrees and 20 degrees from perpendicular as the channel sidewall extends from a top side or bottom side of the bar toward a channel bottom, and wherein the head of each bolt is tapered to provide a tapered head.

31. The sickle bar assembly of claim 30, wherein opposite sides of the tapered head engage opposed channel sidewalls that converge toward one another from a top of the channel toward the channel bottom to form a tapered channel that is complimentary to the tapered head, the tapered head being either conical or including opposed tapered flats, and wherein the tapered head of each bolt is spaced from the channel bottom.

32. The sickle bar assembly of claim 31, wherein the two opposed flats of the tapered head engage the opposed channel sidewalls on opposite sides of the channel to create a joint that interlocks the head and the bar secured by the plurality of fasteners.

33. The sickle bar assembly of claim 14, the opposite channel sidewalls converging toward one another from a top of the channel to a channel bottom to create a tapered channel, the splice surfaces extend radially toward one another to form a tapered splice plate that is complimentary to the tapered channel, and wherein the splice surfaces engage a respective one of the opposite channel sidewalls to create a joint that interlocks the splice plate and the bar that is secured by a plurality of fasteners.

34. A knifeback, comprising: a bar, a channel formed longitudinally into the bar, and a plurality of mounting holes extending through the bar and into the channel, the mounting holes being in an longitudinally extending array providing a plurality of sickle mounting locations in side by side relationship; wherein a sickle bar assembly comprises the knifeback in combination with a plurality of sickle cutting sections, the plurality of sickle cutting sections being along a side of the bar and at sickle mounting locations in side by side relationship secured to the bar by a plurality of fasteners, each fastener having a portion engaging a channel sidewall.

* * * * *